United States Patent
Diegmann et al.

(10) Patent No.: US 10,389,981 B2
(45) Date of Patent: Aug. 20, 2019

(54) METHOD FOR DETECTING A PARKING AREA

(71) Applicant: HELLA KGaA Hueck & Co., Lippstadt (DE)

(72) Inventors: Fabian Diegmann, Berlin (DE); Micha Bruns, Berlin (DE); Torsten Faßbender, Berlin (DE); Ralph Hänsel, Berlin (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 92 days.

(21) Appl. No.: 15/157,529

(22) Filed: May 18, 2016

(65) Prior Publication Data
US 2016/0343139 A1 Nov. 24, 2016

(30) Foreign Application Priority Data

May 19, 2015 (DE) .................. 10 2015 209 147

(51) Int. Cl.
*G06K 9/00* (2006.01)
*H04N 7/18* (2006.01)
(Continued)

(52) U.S. Cl.
CPC ......... *H04N 7/181* (2013.01); *G06K 9/00798* (2013.01); *G06T 7/12* (2017.01);
(Continued)

(58) Field of Classification Search
CPC . G06T 2207/30256; G06T 2207/30264; G06T 7/12; H04N 7/181
See application file for complete search history.

(56) References Cited

U.S. PATENT DOCUMENTS

2009/0243889 A1* 10/2009 Suhr .................. G06K 9/00812
340/932.2
2013/0162829 A1 6/2013 Kadowaki et al.
(Continued)

FOREIGN PATENT DOCUMENTS

| DE | 10 2009 046 726 A1 | 5/2011 |
|---|---|---|
| DE | 10 2011 087 797 A1 | 6/2013 |
| DE | 10 2012 222 497 A1 | 10/2013 |

OTHER PUBLICATIONS

Suhr et al., "Sensor Fusion-Based Vacant Parking SlotDetection and Tracking", Feb. 2014, IEEE Transactions on Intelligent Transportation Systems, vol. 15, No. 1, p. 21-36.*
(Continued)

*Primary Examiner* — Vincent Rudolph
*Assistant Examiner* — Timothy Choi
(74) *Attorney, Agent, or Firm* — Paul D. Strain, Esq.; Strain & Strain PLLC

(57) ABSTRACT

The invention relates to a method for detecting a parking area, in particular for a motor vehicle, having an image capturing device which generates image data of a surrounding area, which image data are evaluated in order to detect a parking area, wherein at least one marker or a plurality of markers of a parking area is or are detected by means of the image data and is or are evaluated and assigned to a parking area which is defined by the at least one marker, wherein, when a parking area is detected, an adjacent area expectation is determined which constitutes a hypothesis that the area adjacent to the detected parking area could also be a parking area, and that the hypothesis is taken into account during the detection of an adjacent parking area.

16 Claims, 7 Drawing Sheets

(51) Int. Cl.
  *G06T 7/12* (2017.01)
  *G08G 1/14* (2006.01)
  *G08G 1/16* (2006.01)

(52) U.S. Cl.
  CPC .... *B60R 2300/806* (2013.01); *G06K 9/00812* (2013.01); *G06T 2207/30256* (2013.01); *G06T 2207/30264* (2013.01); *G08G 1/14* (2013.01); *G08G 1/143* (2013.01); *G08G 1/168* (2013.01)

(56) References Cited

U.S. PATENT DOCUMENTS

| | | | |
|---|---|---|---|
| 2013/0265429 A1 | 10/2013 | Yoon et al. | |
| 2014/0364318 A1 | 12/2014 | Lakrimi | |
| 2015/0317526 A1* | 11/2015 | Muramatsu | G06K 9/00812 348/148 |
| 2016/0039409 A1* | 2/2016 | Hayakawa | B60W 30/06 701/70 |
| 2016/0071415 A1* | 3/2016 | Maeda | G06K 9/00812 348/148 |
| 2016/0188953 A1* | 6/2016 | Tabb | G06F 16/51 382/103 |

OTHER PUBLICATIONS

Suhr et al., "Fully-automatic Recognition of Various Parking Slot Markings in Around View Monitor (AVM) Image Sequences", Sep. 2012, IEEE, 15th Int. IEEE Conf. on Intelligent Transportation Systems, p. 1294-1299.*
Houben et al., "On-Vehicle Video-Based Parking Lot Recognition with Fisheye Optics", Oct. 2013, IEEE, 16th Int. IEEE Conf. on Intelligent Transportation Systems, p. 7-12.*
Suhr et al., "Full-automatic recognition of various parking slot markings using a hierarchical tree structure", Mar. 2013, SPIE, Optical Engineering vol. 52 (3), p. 037203-1-037203-14. (Year: 2013).*
German Search Report, Application No. DE 10 2015 209 147.3, dated Mar. 22, 2016, 8 pgs.

* cited by examiner

METHOD FOR DETECTING A PARKING AREA

CROSS-REFERENCE TO RELATED PATENT APPLICATIONS

This application is based upon and claims the benefit of priority from prior German Patent Application No. 10 2015 209 147.3, filed May 19, 2015, the entire contents of which are incorporated herein by reference in their entirety.

TECHNICAL BACKGROUND

The invention relates to a method for detecting a parking area, in particular to be carried out by means of a moving motor vehicle.

PRIOR ART

Parking areas for parking vehicles, also known generally as parking spaces, are known in a variety of types, wherein the shape and position of the parking areas varies greatly. For example, rectangular or right-angled parking areas are known which are arranged with their longitudinal direction longitudinally or transversely with respect to a roadway which leads past them and can be driven on. Parking areas which are arranged obliquely with respect to such a roadway which leads past them, and are therefore arranged at an angle of approximately 30° to 60° or from 120° to 150° between the longitudinal direction of the parking area and the direction of the roadway, are also known. In a modification of this, parallelogram-shaped parking areas have become known which with their longitudinal direction also describe an angle with respect to the direction of the roadway. As a further modification, parking areas have become known which are embodied in the manner of a parallelogram toward the front or rear and are embodied at a right angle at the rear or at the front. At the front and at the rear means here at a distance from the roadway or near to the roadway. In this context, the parking areas are usually arranged in a regular way, in a row one next to the other, with the result that a multiplicity of vehicles can be parked there.

The parking areas are usually also marked in a defined fashion, with the result that the driver of a motor vehicle can also recognize the individual parking area as such. For this purpose, for example continuous markers are provided on the long and/or short sides of the parking area, which mark the parking area laterally or around its periphery. Alternatively, it is known that interrupted lines or markers are provided on the long and/or short sides of the parking area. Parking areas with different colors of adjacent parking areas are also known, with the result that the parking areas are delimited from one another by means of the color. This selection of color of the parking areas can be made, for example, by means of different colored paving stones. Furthermore, it is also known for L-shaped, T-shaped or cross-shaped markers to be arranged at the corners of the parking areas. As a result, the respective parking areas or a row of parking areas or even a plurality of rows of parking areas are indicated at their respective corner regions. The markers are frequently shortened, frayed and/or divided into a large number of smaller markers by environmental influences. Markers which are provided sometimes crumble away and paving stones become colored or are concealed by plants such as, for example, moss. Furthermore, markers are made smaller and/or visible in a divided way as a result of being concealed by objects such as road users.

Therefore, for the automatic detection of such parking areas there is always the problem that markers have poor quality or poor detectability or are possibly also concealed, with the result that one or more parking area cannot be identified unambiguously.

DE 10 2011 087 797 A1 discloses a method for detecting a parking area on the basis of a 2-D camera image. However, in this context only one parking area is considered and the relevant boundary lines are evaluated. The method has the same disadvantages as described above in the case of boundary lines which are difficult to detect or are concealed. DE 10 2012 222 497 A1 discloses a similar method for detecting a parking area. The method disclosed therein has the same disadvantages.

SUMMARY OF THE INVENTION, PROBLEM, SOLUTION, ADVANTAGES

The problem addressed by the invention is therefore to provide a method for detecting parking areas which is easy to carry out but nevertheless permits reliable detection of parking areas. The object of the invention is also to provide a motor vehicle for carrying out the method.

The problem according to the invention is solved with respect to the method by means of the features of claim 1.

An exemplary embodiment of the invention relates to a method for detecting a parking area, in particular for a motor vehicle, having an image capturing device which generates image data of a surrounding area, which image data are evaluated in order to detect a parking area, wherein at least one marker or a plurality of markers of a parking area is or are detected by means of the image data and is or are evaluated and assigned to a parking area which is defined by the at least one marker, wherein, when a parking area is detected, an adjacent area expectation is determined which constitutes a hypothesis that the area adjacent to the detected parking area could also be a parking area, and that the hypothesis is taken into account during the detection of an adjacent parking area. In this context, use is therefore made of the fact that parking areas are usually arranged in rows, with the result that a certain regularity can be expected on this basis and this regularity is correspondingly also used to evaluate areas.

In this context it is particularly advantageous if the hypothesis predefines the presence of a parking area and properties of the parking area as a proposal. The hypothesis therefore predefines an assumed possibility of the state of the adjacent area, from which the method assumes that this state is present or could be present.

In this context it is particularly advantageous if for the determination of the adjacent area expectation, the ability of the parking area to form a row is determined on the basis of the at least one detected marker, wherein the ability to form a row indicates a probability of a row. The detection of the ability to form a row increases the probability of the area adjacent to a parking area also again being a parking area. If the ability to form a row is not detected, it can nevertheless be present. However, other indications are possible according to which the ability to form a row would have to be excluded. Therefore, the ability to form a row acquires a helpful indicative character about the state of the adjacent area which can be evaluated.

It is therefore particularly advantageous if, for the determination of the ability to form a row, the marker or the markers is or are evaluated as to whether they imply the formation of a row, permit the formation of a row or exclude the formation of a row. In this context there are markers which are configured in such a way that they apply to two adjacent parking spaces and therefore indicate or suggest the ability to form a row. Other markers are neutral and can allow the parking area to be part of a row or also not to be part of a row. In contrast, other markers are to be evaluated as meaning that no row or no further row is present any more.

It is also advantageous if for the determination of the adjacent area expectation, compatibility of the adjacent area is determined on the basis of the at least one detected marker, wherein the compatibility indicates a probability of the adjacent area being a parking area of a row of parking areas. In this context, it is evaluated whether the determined adjacent area is compatible, that is to say whether its surface area fits that of the detected parking area located to its side. When the compatibility is checked, it is possible, in particular, for the dimensions and the orientation of the area to be taken into account in this context.

In this context it is also advantageous if the compatibility is determined on the basis of the type of the at least one marker of the adjacent area.

It is likewise advantageous if the adjacent area can be assigned to a row of parking areas if the adjacent area is compatible with the parking area. In contrast, if the parking area were not compatible, it would, under certain circumstances, already be possible to conclude therefrom that the adjacent area is part of a row of parking areas.

It is also advantageous if the marker is: a side marker of a parking area, a corner marker of a parking area and/or an area identifier, and/or parts of the specified markers. On the basis of these markers it is possible, in an ideal case, to identify the parking area unambiguously. In this context, the respective markers may also occur repeatedly. Side markers can be provided on more than one, two, three or four sides of the parking area. The corner markers can also be provided at more than one, two, three or four corners of the parking area.

It is also advantageous here if a detected marker of an adjacent area is identified on the basis of the adjacent area expectation and/or the compatibility as a parking area marker of a parking area.

It is assumed here that the detected marker does not have to be unambiguous considered in itself but rather this marker can be identified with a high probability as a marker of a parking area owing to the adjacent area expectation and/or the compatibility. This may occur, in particular, with respect to an alternative parking area which would have been identified on the basis of other potential markers and/or another interpretation of the detected markers, without the adjacent area expectation being taken into account.

It is also advantageous if the image data of an image data recording are evaluated and/or corrected on the basis of the adjacent area expectation. In this context, image data can, for example, be supplemented or corrected if the image data are poor in quality, and on the basis of the adjacent area expectation a marking element is added and/or corrected in such a way that it corresponds to an expected marking element.

Alternatively or additionally, the search for markers can take place in a region in which the markers are expected. In this context, the adjacent area expectation is, for example, only checked and a search of the image for alternative markers is not carried out until said markers cannot be found or cannot be found with a sufficient quality. As a result, the detection method can be improved further.

It is particularly advantageous if the method for detecting a parking area is carried out by means of a moving motor vehicle. As a result, it is possible to generate and evaluate an image data sequence which evaluates a relatively large surface area along which the vehicle moves.

The method can basically be carried out with at least one marker or with a plurality of markers. In this context, the number of detected markers can increase the detection quality, wherein, depending on the detected marker used, the latter can also fluctuate rather as a number which tends to be considered an optimum one.

The problem according to the invention with respect to the motor vehicle is solved by means of the features of claim 12.

An exemplary embodiment of the invention relates to a motor vehicle having at least one image capturing device for capturing image data relating to the surrounding area of the motor vehicle and having a control unit for evaluating the image data, wherein a method according to the invention can be carried out by means of the motor vehicle.

Further advantageous refinements are described by the following description of the figures and by the dependent claims.

BRIEF DESCRIPTION OF THE DRAWINGS

The invention will be explained in more detail below on the basis of at least one exemplary embodiment and with reference to the figures in the drawing, in which.

PREFERRED IMPLEMENTATION OF THE INVENTION

Figure 1:
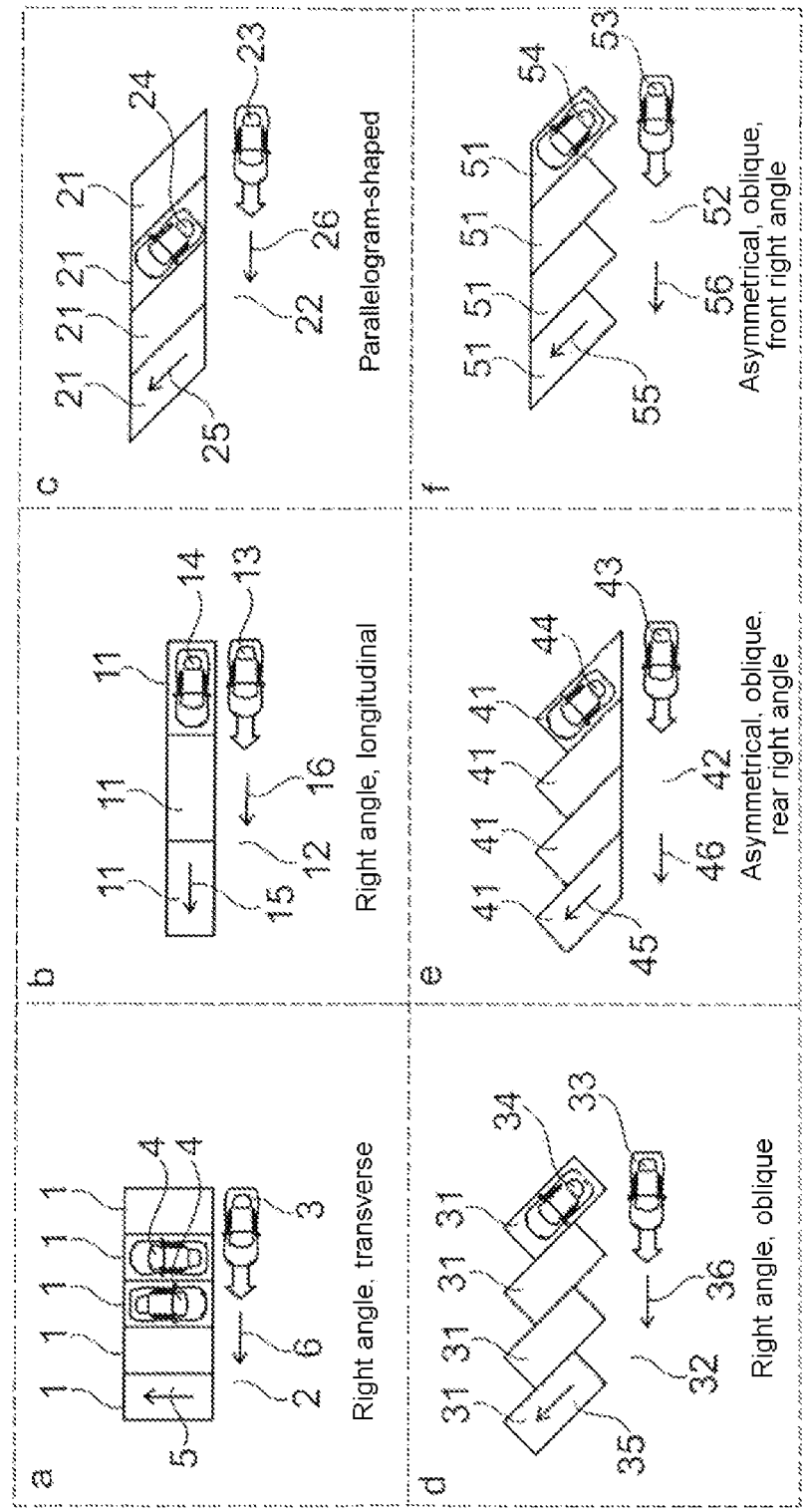
FIG. 1 shows a schematic illustration of various arrangements of parking areas.

FIG. 1 shows, in an illustration with six partial Figures a to f, in each case an arrangement of parking areas 1 which are each arranged in a row. The partial Figure a illustrates five parking areas 1 which are arranged adjacent to one another on their longitudinal sides, and have a roadway 2 passing their short narrow sides. A motor vehicle 3 is arranged on the roadway and is driving along the parking areas 1 on the roadway 2. Two of the parking areas 1 are occupied by parked motor vehicles 4, with the result that only three parking areas 1 are still free. The parking areas 1 are embodied in a rectangular fashion and their longitudinal direction 5 runs perpendicularly with respect to the direction 6 of the roadway 2. The parking areas 1 are arranged transversely with respect to the roadway 2. The motor vehicle 3 is a motor vehicle by means of which the method according to the invention is carried out.

The partial Figure b illustrates three parking areas 11 which are arranged adjacent to one another on their narrow sides, and have a roadway 12 passing their longitudinal sides. A motor vehicle 13 is arranged on the roadway 12 and is driving along the parking areas 11 on the roadway 12. One of the parking areas 11 is occupied by a parked motor vehicle 14, with the result that only two parking areas 11 are still free. The parking areas 11 are embodied in a rectangular fashion and their longitudinal direction 15 runs parallel to the direction 16 of the roadway 12. The parking areas 11 are arranged along the roadway 12. The motor vehicle 13 is a motor vehicle by means of which the method according to the invention is carried out.

The partial Figure c illustrates four parking areas 21 which are arranged adjacent to one another on their longitudinal sides, and have a roadway 22 passing their narrow sides. A motor vehicle 23 is arranged on the roadway 22 and is driving along the parking areas 21 on the roadway 22.

One of the parking areas 21 is occupied by a parked motor vehicle 24, with the result that only three parking areas 21 are still free. The parking areas 21 are embodied in the manner of a parallelogram and their longitudinal direction 25 runs at an angle between 0 and 180°, preferably between 30° and 60° or between 120° and 150°, with respect to the direction 26 of the roadway 22. The motor vehicle 23 is a motor vehicle by means of which the method according to the invention is carried out.

The partial Figure d illustrates four parking areas 31 which are arranged adjacent to one another on their longitudinal sides, and have a roadway 32 passing their narrow sides. A motor vehicle 33 is arranged on the roadway 32 and is driving along the parking areas 31 on the roadway 32. One of the parking areas 31 is occupied by a parked motor vehicle 34, with the result that only three parking areas 31 are still free. The parking areas 31 are embodied in a rectangular fashion and their longitudinal direction 35 runs at an angle between 0° and 90180°, preferably between 30° and 60° or between 120° and 150° with respect to the direction 36 of the roadway 32. The motor vehicle 33 is a motor vehicle by means of which the method according to the invention is carried out.

The partial Figure e illustrates four parking areas 41 which are arranged adjacent to one another on their longitudinal sides, and have a roadway 42 passing their narrow sides. A motor vehicle 43 is arranged on the roadway 42 and is driving along the parking areas 41 on the roadway 42. One of the parking areas 41 is occupied by a parked motor vehicle 44, with the result that only three parking areas 41 are still free. The parking areas 41 are embodied in a rectangular fashion at their front side and in the manner of a parallelogram at their rear side and their longitudinal direction 45 runs at an angle between 0° and 180°, preferably between 30° and 60° or between 120° and 150° with respect to the direction 46 of the roadway 42. The motor vehicle 43 is a motor vehicle by means of which the method according to the invention is carried out.

The partial Figure f illustrates four parking areas 51 which are arranged adjacent to one another on their longitudinal sides, and have a roadway 52 passing their narrow sides. A motor vehicle 53 is arranged on the roadway 52 and is driving along the parking areas 51 on the roadway 52. One of the parking areas 51 is occupied by a parked motor vehicle 54, with the result that only three parking areas 51 are still free. The parking areas 51 are embodied in a rectangular fashion at their rear side and embodied in the manner of a parallelogram at their front side, and their longitudinal direction 55 runs at an angle between 0 and 180°, preferably between 30° and 60° or between 120° and 150°, with respect to the direction 56 of the roadway 52. The motor vehicle 53 is a motor vehicle by means of which the method according to the invention is carried out.

Figure 2:
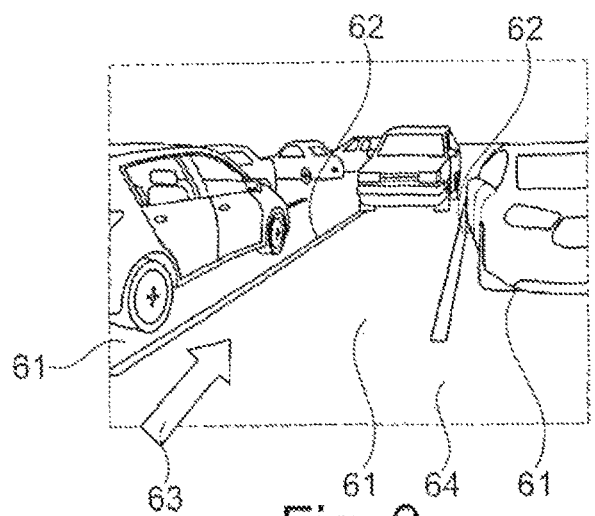
FIG. 2 shows a schematic illustration of an arrangement of parking areas.

FIG. 2 shows a parking area arrangement according to FIG. 1e in which the parking areas 61 are indicated by continuous lines 62 on their longitudinal sides. Entry into the parking area occurs via the narrow side along the arrow 63. The color of the parking area 61 is essentially the same as the color of the roadway 64. The color of the line 62 is different than the color of the parking area 61.

Figure 3:
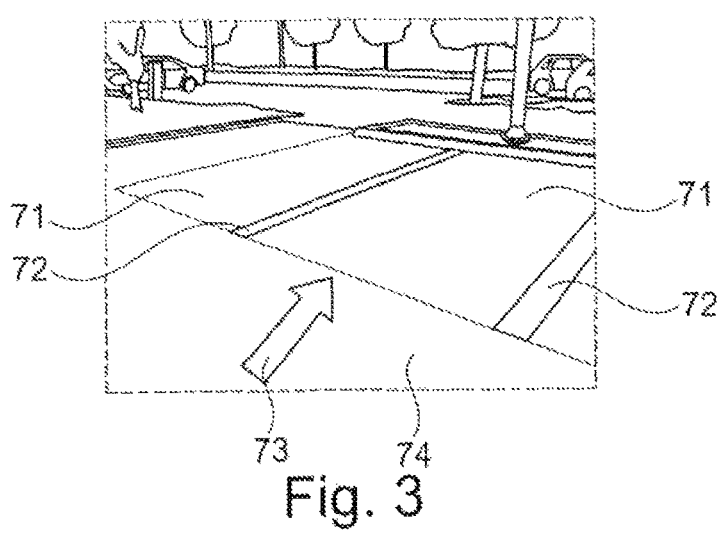
FIG. 3 shows a schematic illustration of an arrangement of parking areas.

FIG. 3 shows a parking area arrangement according to FIG. 1a in which the parking areas 71 are indicated separated from one another by continuous lines 72 on their longitudinal sides. Entry into the parking area 71 occurs via the narrow side along the arrow 73. The color of the parking area 71 differs from the color of the roadway 74. The color of the line 72 is different than the color of the parking area 71 and of the roadway 74.

Figure 4:
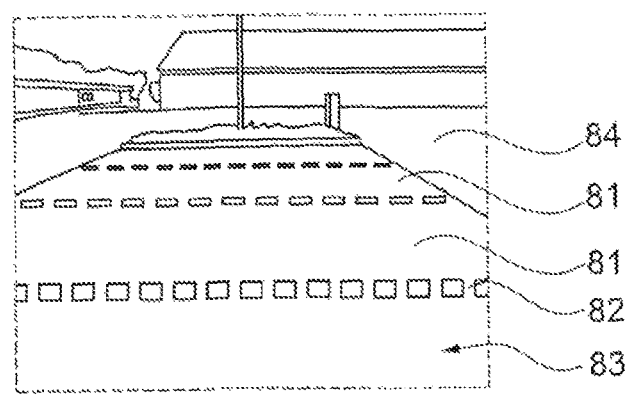
FIG. 4 shows a schematic illustration of an arrangement of parking areas.

FIG. 4 shows a parking area arrangement according to FIG. 1a in which the parking areas 81 are indicated separated from one another by interrupted lines 72 on their longitudinal sides. Entry into the parking area 81 occurs via the narrow side along the arrow 83. The color of the parking area 81 differs from the color of the roadway 84. The color of the line 82 is different than the color of the parking area 81 and of the roadway 84. The interrupted line is generated by the spaced-apart arrangement of paving stones.

Figures 5, 6:
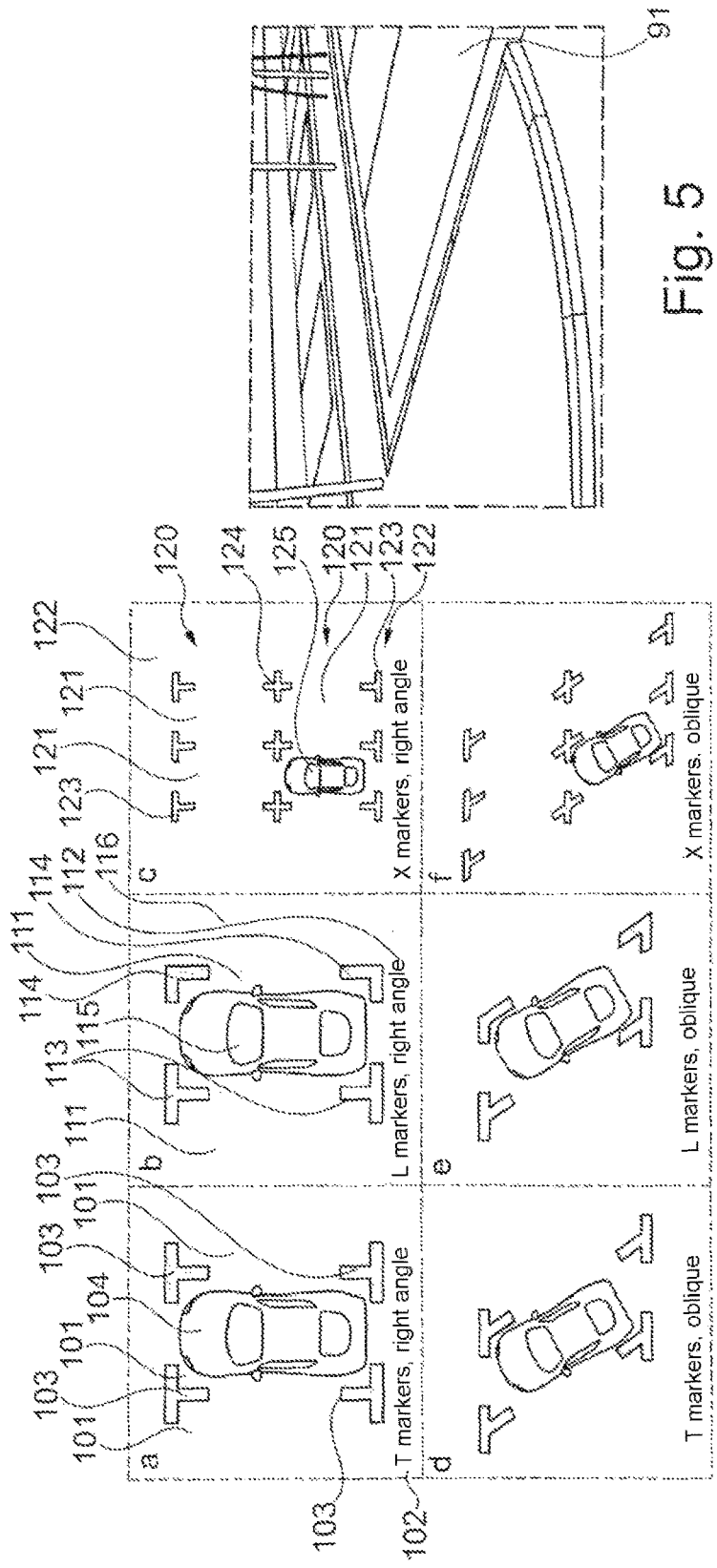
FIG. 5 shows a schematic illustration of various arrangements of parking areas.
FIG. 6 shows a schematic illustration of an arrangement of parking areas.

FIG. 5 shows a parking area arrangement according to FIG. 1a in which the parking areas 91 are delimited by their color from the roadway and from the adjacent area and from the adjacent parking area.

FIG. 6 shows, in an illustration with six partial Figures a to f, in each case an arrangement of parking areas which are each arranged in at least one row. In the partial Figure a, three parking areas 101 are illustrated one next to the other and are arranged in an arrangement according to FIG. 1a. The delimitation of the parking areas 101 with respect to one another and with respect to the roadway 102 which leads past is made by means of T-shaped markers 103 which are arranged at the respective corners of the parking areas 101. The central parking area 101 which is shown is occupied by a motor vehicle 104.

In the partial Figure b, two parking areas 111 are illustrated one next to the other and are arranged in an arrangement according to FIG. 1a. The delimitation of the parking areas 111 with respect to one another and with respect to the roadway 112 which leads past is made in the row by means of T-shaped markers 113 which are arranged at the respective corresponding corners of the parking areas 111. The delimitation of the parking areas 111 with respect to the adjacent area 116 and with respect to the roadway 112 which leads past is made at the end of the row by means of L-shaped markers 114 which are arranged at the respective corresponding edge-side corners of the parking areas 111. The end-side parking area 111 is occupied by a motor vehicle 115.

In the partial Figure c, two rows 120 of parking areas 121 are provided, wherein parking areas 121 are arranged one next to the other in each row 120. The arrangement of the parking areas corresponds essentially to the arrangement according to FIG. 1a. The delimitation of the parking areas 121 with respect to one another and with respect to the roadway 122 which leads past is made in the row by means of T-shaped markers 123 which are arranged at the respective corresponding corners of the parking areas 121. The delimitation of the parking areas 121 of a row 120 with respect to parking areas 121 of the other row 120 is made by means of cross-shaped markers 124 which are arranged at the respective corresponding corners of the parking areas 121. One of the parking areas is occupied by a motor vehicle 125.

The partial Figures d, e and f in FIG. 6 show arrangements of parking areas which are parallelogram-like, in contrast to the parking areas in partial Figures a, b and c of FIG. 6. The markers for delimiting the parking areas are not strictly T-shaped, L-shaped or cross-shaped here but instead have an inclination which corresponds to the inclination of the longitudinal direction of the parking area with respect to the roadway. A detailed description is not given but instead reference is made to the partial Figures a to c of FIG. 6. The markers shown in partial Figures d to f of FIG. 6 are therefore to correspond essentially to the markers of the partial Figures a to c of FIG. 6 and are also detected and identified as such.

Figure 7:
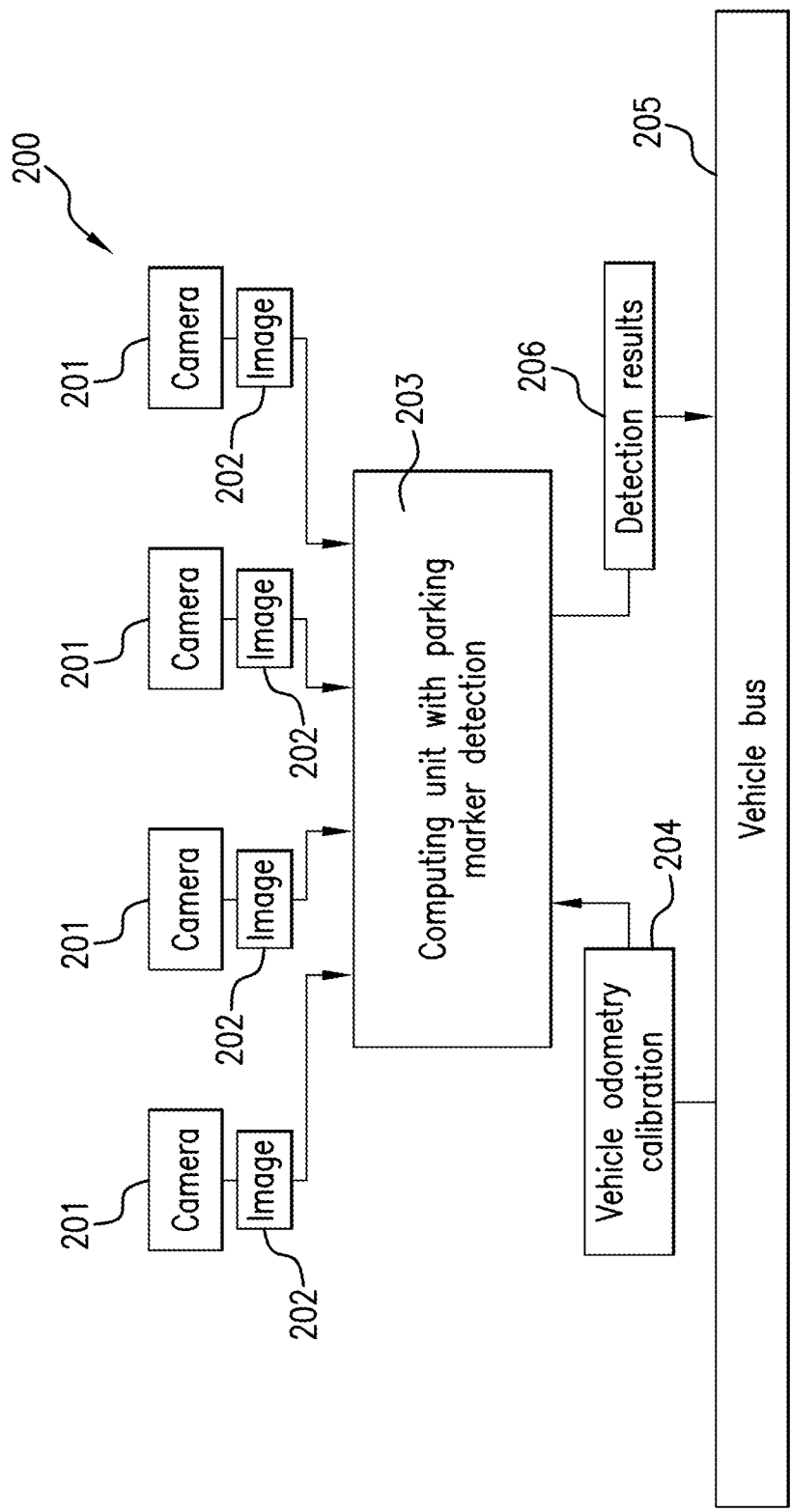
FIG. 7 shows a block circuit diagram explaining the method according to the invention.

FIG. 7 shows an illustration of a block circuit diagram explaining the method according to the invention for detecting a parking area, in particular for a motor vehicle.

The motor vehicle 200 or the corresponding device is provided with at least one image capturing device 201. In this context, it is also possible to provide more than one image capturing device 201, as is shown by FIG. 7. In said figure, four such image capturing devices 201 are arranged. An image capturing device 201 is here, for example, a camera or the like which can generate an image of a surrounding area and therefore can generate image data 202 relating to a surrounding area. In this context, the term surrounding area is usually limited to what the image capturing device 201 can capture. This may turn out completely differently depending on the image capturing device 201 used.

The image data 202 relating to the surrounding area is used for evaluation in order to detect a parking area. A control unit 203, also referred to as a computing unit, is advantageously used to evaluate the image data 202, said control unit 203 receiving the image data 202.

In this context, the control unit 203 can use odometry data 204 of the motor vehicle 200 or else calibration data of the motor vehicle 200. The odometry is here a method of estimating the position and orientation of a mobile system on the basis of the data of its propulsion system. This data can be made available, for example, via a vehicle bus or data bus 205, such as via a CAN bus or LIN bus or the like. The control unit 203 can also pass on the detection results 206 via the data bus or vehicle bus 205 to other devices or units in the motor vehicle and output said detection results 206 on a display, for example. Vehicle data such as, for example, the speed and/or the yaw rate, are available as odometry data.

In this context, markers of a parking area are identified by means of the image data 202 and evaluated and assigned to a parking area which is defined by the markers.

As a result, on the basis of the markers, a parking area can be identified in terms of its position and size, and the location of the parking area can therefore be determined.

In this context, when a parking area is detected an adjacent area expectation is likewise determined which assumes that, under certain circumstances, a further parking area could also be arranged next to the detected parking area. The adjacent area expectation therefore essentially constitutes a probability of the area adjacent to the detected parking area also being a parking area, with the result that the adjacent area can also be identified as a parking area.

Therefore, parking areas are detected and their location determined on the basis of image data of the at least one image capturing device, wherein at least one parking area and/or adjacent area are/is detected as a function of an adjacent area expectation. An adjacent area is here the parking area which follows a parking area or a row of parking areas and is composed of at least one parking area. It follows said area in a specific direction, and is therefore adjacent thereto on one side.

The adjacent area expectation is formed here as a function of at least one parking area and/or row of parking areas which have/has already been detected. In this context, the ability of parking areas to form rows is taken into account. In this context, it is basically possible to differentiate between row-forming and non-row-forming parking areas. Furthermore, the probability of the ability to form rows can be determined or defined.

In this context, the ability to form a row is detected or determined on the basis of the type of marker of the parking areas. In this context, it is possible basically to differentiate between three classes of markers in respect of the ability to form a row: markers of parking areas which imply the formation of a row, markers of parking areas which make it possible to form a row or markers of parking areas which exclude the formation of a row.

It is therefore also possible to differentiate between parking areas which imply the formation of a row in a certain direction, parking areas which make it possible to form a row in a certain direction or parking areas which exclude the formation of a row in a certain direction.

The detection of a parking area is therefore carried out as a function of whether a neighboring area such as an adjacent area, can be expected owing to the ability to form a row.

In this context, the adjacent area expectation is used to determine the adjacent area. In this context, it is also possible to take into account the compatibility during the determination of the adjacent area expectation. In the case of the compatibility, a distinction is advantageously made between an area which is compatible with a parking area and/or row of parking areas and an area which is not compatible therewith. It is also possible to derive therefrom a probability of the compatibility of an area. The compatibility can be determined on the basis of the type of marker as a parking space identifier. If the area is compatible on the basis of the marker, it corresponds to the expectations made of an area which is part of a row, that is to say the shape and size thereof. In this context, the compatibility can be defined in the form of a set of at least one compatible marker. Alternatively or additionally, the compatibility can be defined on the basis of expected properties of markers. During the checking of the compatibility, the correspondence of the detected adjacent marker would be compared with the at least one stored marker and/or the property of the marker.

In order to detect the neighboring area as a parking area, the neighboring area, that is to say the adjacent area, is assigned to a row of parking areas precisely when the neighboring area is compatible with the row of parking areas. The detection therefore takes place as a function of which adjacent area can be expected on the basis of the compatibility.

In order to detect and to determine the location of a parking area, the markers are firstly detected as parking space identifiers. These may be, in particular, side identifiers and/or corner identifiers or area identifiers. Alternatively or additionally, the parking area can also be detected on the basis of objects which are located around the area in this respect and the objects adjoining the area, such as for example, the motor vehicles parked there, bushes, buildings etc. If only the adjoining objects are detected, the detection quality is relatively low and a plurality of areas cannot be detected as parking areas. The markers which are extracted from the image data can then be evaluated according to the adjacent area expectation and evaluated as a valid parking area identifier. As a result, in particular, weak, damaged and/or concealed parking area identifiers can be identified as valid parking area identifiers. The high degree of robustness of the detection of parking areas can also be achieved even in the case of a surface which is soiled in some way or in the case of a surface which is changed visually as a result of directional incidence of light/shadow.

According to the inventive concept, a marker can be logically linked as a parking area identifier to a valid parking area on the basis of the adjacent area expectation. In this context, all the possible logic operations can be evaluated according to the adjacent area expectation and selected as a valid logic operation.

According to the inventive concept, a measurement of a parking area identifier or marker can also be evaluated according to the adjacent area expectation and also corrected. If the measurement of the marker is only partial because the marker is damaged or partially concealed, according to the invention the marker can be identified as such and corrected.

In this context, the search for a marker as a parking area identifier within the sensor data can be made more efficient or robust by virtue of the adjacent area expectation.

The method therefore permits automatic detection of parking areas from a moving motor vehicle. In this way, the driver can be informed about the existence of, in particular, free parking areas without the driver himself having to be on the lookout for them. After the identification of the parking area, said area is displayed to the driver, and therefore the geometry and position of the parking area relative to the vehicle is known to the driver, with the result that a manual or automatic parking process can then be initiated. If the driver wishes to park manually, the detected parking areas can be displayed to him as an aid in order to find an optimum parking position.

In this context, an adjacent area can be displayed which is present as the next detected parking area in the direction of travel, that is to say, in particular, in the forward or rearward direction. It is advantageous to detect parking areas as soon as they can be seen. The parking areas can be detected over a plurality of frames. The movement of the at least one camera or cameras is advantageously also corrected here. In this context, the camera or the cameras are those of a motor vehicle.

The camera used as an image capturing device, or a plurality thereof, image the immediate surrounding area of the vehicle. For example, four wide-angle cameras can be used as the image capturing devices and can be embodied as what are referred to as surround view cameras which each have an angle of aperture of approximately 180° and can be installed in the side mirrors on the front and rear of the vehicle.

However, the camera also can be, for example, only the reversing camera which monitors the area directly behind the vehicle and to the side behind the vehicle. However, the method is basically also suitable for use with a front-mounted camera with an installation position behind the windshield with a viewing direction to the front and with an angle of aperture of less than 90°. An omnidirectional camera or a catadioptric camera, which is mounted on the roof and images the entire surroundings of the vehicle with a single imager, would also be suitable. The cameras used are advantageously mounted in such a way that they can image the region to the side of the vehicle with a range of vision of approximately 10 m up to the motor vehicle. The region in front of and behind the motor vehicle can also be imaged, which has an advantageous effect on the detection during the parking process, such as, for example, the subsequent measurement. It is advantageous to use color cameras, since parking spaces are in some cases also defined exclusively by means of the color, and not by means of the brightness of the background, and can be differentiated in this way.

Basically, the method also functions with grayscale cameras or cameras with a reduced color space, such as, for example, what are referred to as RIII cameras ("Red/Clear" with 25% red pixels and 75% grayscale pixels), with the result that only the brightness and the difference in color can be imaged on the red-blue axis.

Figure 8:
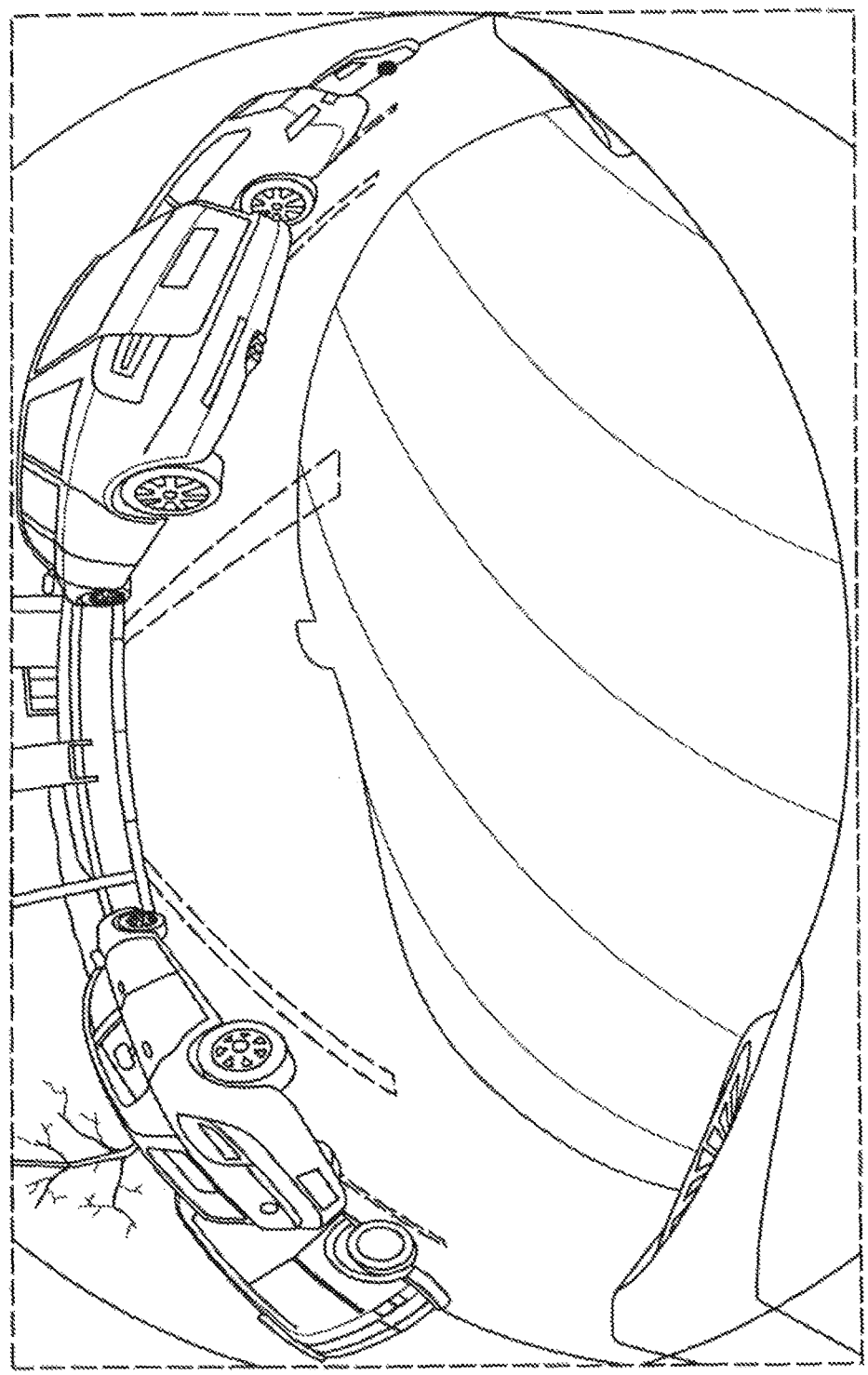
FIG. 8 shows an illustration of an example of an image taken by an image capturing camera for using the method according to the invention.

FIG. 8 shows a recording of an image capturing device which images a row of parking areas. It is apparent here that one of the parking areas is free and the other parking areas which are adjacent thereto are each occupied by a motor vehicle. The parking areas are arranged in accordance with FIG. 1a, wherein the parking areas are marked by two lines which are arranged on their longitudinal sides. The lines are somewhat distorted here, which is due to the optics of the camera used as an image capturing device. A shadow of the motor vehicle which partially darkens the markers is apparent, and this makes detection of the lines as markers more difficult.

Figure 9:
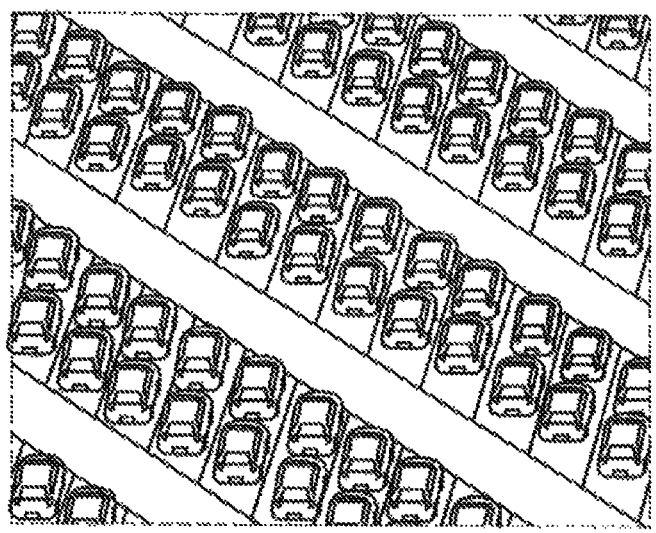
FIG. 9 shows a schematic illustration of an arrangement of parking areas.

FIG. 9 shows an arrangement of a plurality of rows of parking areas which are arranged in double rows according to FIG. 1c. Between every two double rows a roadway is arranged along which the motor vehicles can drive in order to look for a parking area.

Figure 10:
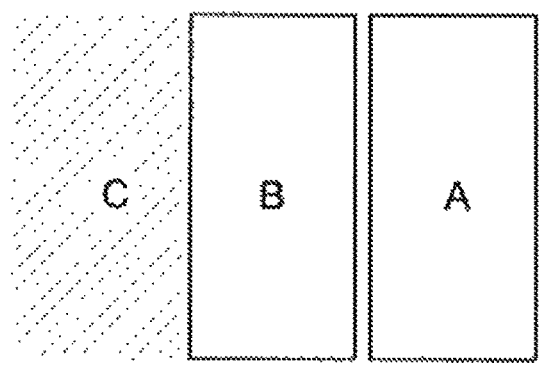
FIG. 10 shows a schematic illustration explaining the method according to the invention.
Figure 10:
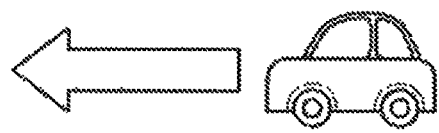

FIG. 10 shows the arrangement of parking areas of a row of parking areas. In this context, two parking areas A, B are arranged in a row. Owing to the adjacent area expectation, the adjacent area C which is arranged next to the area B can also be a parking area. Said area C can advantageously have the same dimensions here as the parking areas A and B which have already been detected and is part of a row, together with the parking areas A and B.

For regular parking spaces it can be assumed that directly adjacent parking areas have a high probability of having the same characteristic properties as their respective neighbors. This applies in particular to parking areas which are arranged in rows, that is to say, for example, in supermarket car parks, at the edges of roads etc. The characteristic properties may be, for example: length, width, shape, orientation and type of markers. Exceptions to this are, for example, special parking areas such as parking spaces for disabled people and parking areas at the start and/or at the end of rows of parking areas. Correspondingly, an a-priori hypothesis for the area C, that the area C is a parking area, can be determined on the basis of existing adjacent observations with respect to the parking areas A and B.

The method according to the invention has here the advantage that it transfers the properties of a parking area which has already been observed in the past to a new area and also to a new parking area which it was not yet possible to observe so well, for example, owing to concealment by a vehicle. In this case, an a-priori hypothesis about the adjacent area can be formed on the basis of the existing observations. This a-priori hypothesis can be used here in different ways:

Strengthening of weak measurements insofar as they fit the hypothesis: if, in the regions for which an a-priori hypothesis C has been formed, potential markers which fit the hypothesis are observed, the confidence thereof can be strengthened compared to other markers. Alternatively, segments which are manifested in too small or too weak a form, such as, for example, as a result of concealment, for regular markers, can nevertheless be treated as valid markers, since they fit the hypothesis.

Figure 11:
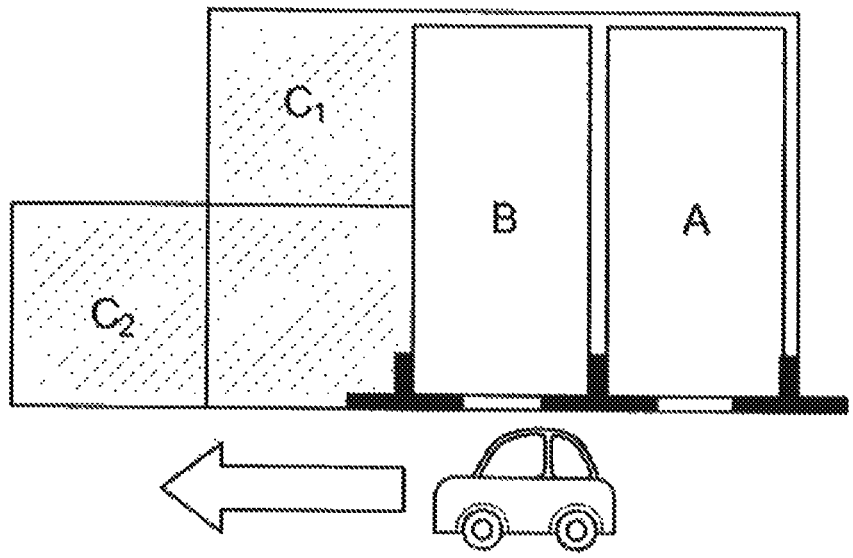
FIG. 11 shows a schematic illustration explaining the method according to the invention.

A selection of orientation alternatives: in a row of parking areas, a basic change in the orientation is extremely rare. In a row of parking areas whose longitudinal direction is orthogonal with respect to the direction of travel, a parking area will very rarely adjoin the same front edge longitudinally with respect to the direction of travel. Therefore, if a plurality of possible orientations (C1, C2) were possible by means of observation alone, only that orientation (C1) which fits the previous observations (A, B) are passed on, see FIG. 11.

Figure 12:
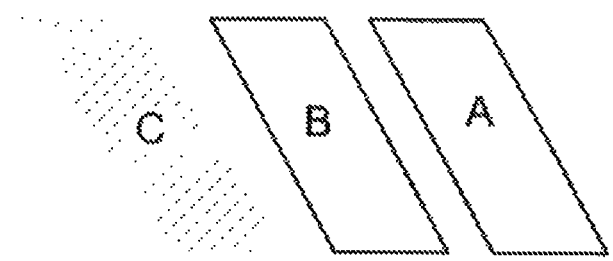
FIG. 12 shows a schematic illustration explaining the method according to the invention.

An improvement in the detail direction measurement: as a result of calibration errors, the orientation of a parking area can, under certain circumstances, not be measured well if it is far from the motor vehicle. Here, the measurement of the orientation can be assisted and improved by means of existing measurements, see FIG. 12. In this context, a deviating orientation of the area C can be corrected by assigning the orientation of the areas A and B to it.

An improvement in the length measurement: as a result of concealment by parked vehicles, the rear edge of a parking area is, under certain circumstances, not detectable. In this case, it is possible to assume that the length of the area C corresponds to the length of the areas of A and B. Insofar as there are observations to the effect that C basically exists, such as a front marker, C can be output with the length of A and B.

In the event of the specific observation of C contradicting the a-priori hypothesis, the hypothesis is rejected. The hypothesis can be used only for an "improvement" if an observation exists which supports the hypothesis, even if this observation, as the only indication of a parking area, is of insufficient quality.

By means of the parking area row optimizer, it is possible to use a plurality of measurements of parking areas which are different but of the same type to improve the overall result of the measurement. Depending on the output latency which is required this can take place, as described, by means of a-priori hypotheses which are then confirmed or contradicted as quickly as possible by means of observations. Alternatively, it is also possible firstly to collect a set of observations and then, after the conclusion of all the measurements, to improve them by means of the global optimization of all the measurements. The latter should be able to provide better quality, but is unsuitable for a real-time detection system.

LIST OF REFERENCE NUMBERS

1 Parking area
2 Roadway
3 Motor vehicle
4 Parked motor vehicle
5 Longitudinal direction
6 Direction
11 Parking area
12 Roadway
13 Motor vehicle
14 Parked motor vehicle
15 Longitudinal direction
16 Direction
21 Parking area
22 Roadway
23 Motor vehicle
24 Parked motor vehicle
25 Longitudinal direction
26 Direction
31 Parking area
32 Roadway
33 Motor vehicle
34 Parked motor vehicle
35 Longitudinal direction
36 Direction
41 Parking area
42 Roadway
43 Motor vehicle
44 Parked motor vehicle
45 Longitudinal direction
46 Direction
51 Parking area
52 Roadway
53 Motor vehicle
54 Parked motor vehicle
55 Longitudinal direction
56 Direction
61 Parking area
62 Line
63 Arrow
64 Roadway
71 Parking area
72 Line
73 Arrow
74 Roadway
81 Parking area
82 Line
83 Arrow
84 Roadway
91 Parking area
101 Parking area
102 Roadway
103 Marker
104 Motor vehicle
111 Parking area
112 Roadway
113 Marker
114 Marker
115 Motor vehicle
116 Area
120 Row
121 Parking area
122 Roadway
123 Marker
124 Marker
125 Motor vehicle
200 Motor vehicle
201 Image capturing device
202 Image data
203 Control unit
204 Odometry data
205 Data bus/vehicle bus
206 Detection results

The invention claimed is:

1. A method for detecting a parking area using data relating to adjacent parking areas, the method comprising:
providing an image capturing device, the image capturing device being mounted on a vehicle;
generating image data relating to a surrounding area using the image capturing device;
detecting a parking area by evaluating the image data in a control unit, wherein the control unit detects at least one marker defining a boundary of the parking area and assigns the at least one marker to the parking area by evaluating the image data;
when a parking area is detected, forming an a priori hypothesis that an adjacent area to the parking area has a probability of being a second parking area, wherein the hypothesis predefines a probability of a second parking area and includes a determination of whether the parking area is able to form a row of parking areas on the bases of the at least one detected marker, wherein the hypothesis includes a plurality of potential orientations of the second parking area;
combining the hypothesis with the image data to determine whether the adjacent area is a second parking area, wherein said combining selects an orientation from the plurality of potential orientations of the second parking area that fits with an orientation of the parking area.

2. The method according to claim 1, wherein the ability to form a row of parking areas is quantified by a probability of a row of parking areas.

3. The method according to claim 2, wherein, for the determination whether the parking area is able to form a row of parking areas, the at least one detected marker is evaluated as to whether it implies the formation of a row of parking areas, permits the formation of a row of parking areas, or excludes the formation of a row of parking areas.

4. The method according to claim 2, wherein the hypothesis includes a determination of compatibility based on the at least one detected marker, wherein a probability of the adjacent area being a second parking area of a row of parking areas can be determined on the basis of the compatibility of the adjacent area with the row of parking areas.

5. The method according to claim 4, wherein the compatibility is determined on the basis of the type of the at least one marker of the adjacent area.

6. The method according to claim 4, wherein the adjacent area can be assigned to a row of parking areas if the adjacent area is compatible with the parking area.

7. The method according to claim 1, wherein the at least one marker is selected from the group consisting of a side marker of a parking area, a corner marker of a parking area, and an area identifier, or combinations thereof.

8. The method according to claim 1, wherein a detected marker of the adjacent area is identified based on the hypothesis and a compatibility as a parking area marker of a second parking area.

9. The method according to claim 8, wherein the image data are evaluated or corrected on the basis of the adjacent area expectation.

10. A motor vehicle having at least one image capturing device for capturing image data relating to the surrounding area of the motor vehicle and having a control unit for evaluating the image data, wherein the image capture device and the control unit are configured to perform the method according to claim 1.

11. The method according to claim 1, wherein the image data includes a representation of objects adjoining the parking area, wherein the hypothesis includes an evaluation of these objects adjoining the parking area.

12. The method according to claim 11, wherein the objects adjoining the parking area are selected from the group consisting of other cars, bushes, and buildings.

13. The method according to claim 1, wherein the hypothesis incorporates vehicle odometry data.

14. The method according to claim 1, wherein at least one second marker of the parking area is damaged, faded, or concealed.

15. A method for detecting a parking area using data relating to adjacent parking areas, the method comprising:
providing an image capturing device, the image capturing device being mounted on a vehicle;
generating image data relating to a surrounding area using the image capturing device;
detecting a parking area by evaluating the image data in a control unit, wherein the control unit detects at least one marker defining a boundary of the parking area and assigns the at least one marker to the parking area by evaluating the image data;
when a parking area is detected, forming an a priori hypothesis that an adjacent area to the parking area has a probability of being a second parking area, wherein the hypothesis predefines a probability of a second parking area and includes a determination of whether the parking area is able to form a row of parking areas on the bases of the at least one detected marker, wherein when a rear edge of the second parking area is concealed by a parked vehicle and not detectable;
combining the hypothesis with the image data to determine whether the adjacent area is a second parking area, wherein said combining assumes the length of the second parking area corresponds to the length of the parking area.

16. A method for detecting a parking area using data relating to adjacent parking areas, the method comprising:
providing an image capturing device, the image capturing device being mounted on a vehicle;
generating image data relating to a surrounding area using the image capturing device;
detecting a parking area by evaluating the image data in a control unit, wherein the control unit detects at least one marker defining a boundary of the parking area and assigns the at least one marker to the parking area by evaluating the image data;
when a parking area is detected, forming an a priori hypothesis that an adjacent area to the parking area has a probability of being a second parking area, wherein the hypothesis predefines a probability of a second parking area and includes a determination of whether the parking area is able to form a row of parking areas on the bases of the at least one detected marker;
detecting a plurality of second markers which on their own are each too small or too weak to generate sufficient confidence to be treated as valid markers;
combining the hypothesis with the image data to determine whether the adjacent area is a second parking area, wherein said combining evaluates the plurality of second markers and strengthens the confidence a subset of the plurality of markers which correspond to the hypothesis such that after strengthening the subset have sufficient confidence are treated as valid markers.

* * * * *